United States Patent
Son et al.

(10) Patent No.: US 9,430,100 B2
(45) Date of Patent: Aug. 30, 2016

(54) ACOUSTIC TOUCH APPARATUS WITH MULTI-TOUCH CAPABILITY

(71) Applicant: Elo Touch Solutions, Inc., Milpitas, CA (US)

(72) Inventors: Kyu-Tak Son, Mountain View, CA (US); Joel C. Kent, Fremont, CA (US)

(73) Assignee: Elo Touch Solutions, Inc., Milpitas, CA (US)

( * ) Notice: Subject to any disclaimer, the term of this patent is extended or adjusted under 35 U.S.C. 154(b) by 0 days.

(21) Appl. No.: 14/949,746

(22) Filed: Nov. 23, 2015

(65) Prior Publication Data

US 2016/0162122 A1    Jun. 9, 2016

Related U.S. Application Data

(63) Continuation of application No. 13/416,940, filed on Mar. 9, 2012, now Pat. No. 9,201,546.

(51) Int. Cl.
*G06F 3/043* (2006.01)

(52) U.S. Cl.
CPC ... *G06F 3/0433* (2013.01); *G06F 2203/04104* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,581,879 B2 * | 11/2013 | Vieta | ...................... | G06F 3/0412 178/18.06 |
| 2011/0018834 A1 * | 1/2011 | Yuan | ....................... | G02F 1/00 345/173 |
| 2011/0175823 A1 * | 7/2011 | Vieta | ...................... | G06F 3/0412 345/173 |
| 2011/0234545 A1 * | 9/2011 | Tanaka | .................. | G06F 3/0436 345/177 |
| 2014/0028557 A1 * | 1/2014 | Otake | ................. | G02F 1/13338 345/158 |
| 2014/0035854 A1 * | 2/2014 | Vieta | ...................... | G06F 3/0412 345/173 |

\* cited by examiner

*Primary Examiner* — Van Chow
(74) *Attorney, Agent, or Firm* — Alston & Bird LLP

(57) ABSTRACT

An acoustic touch apparatus that utilizes the transfer of surface acoustic waves from one surface, through the touch substrate, to another surface to enable multi-touch capabilities.

11 Claims, 13 Drawing Sheets

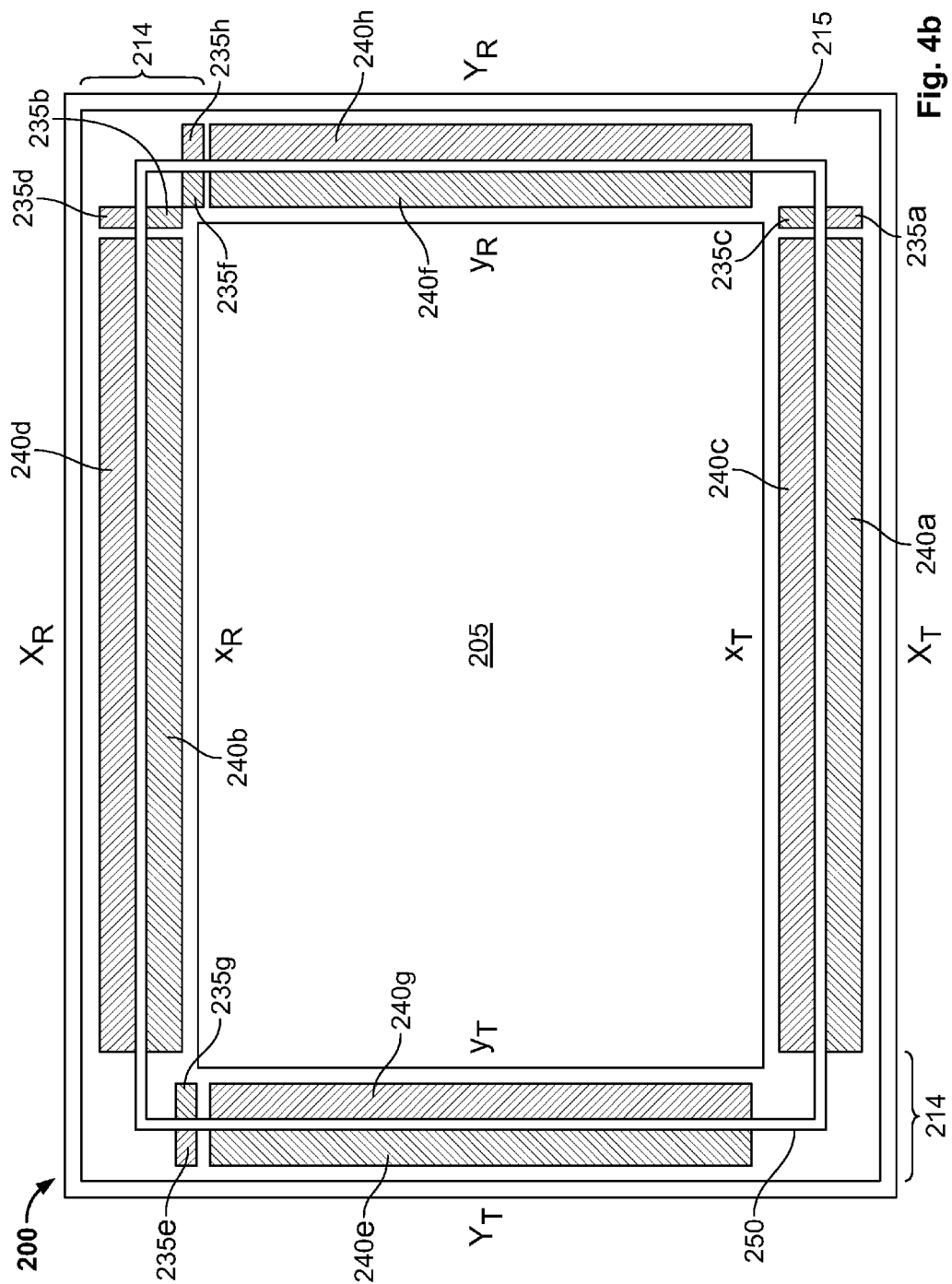

ACOUSTIC TOUCH APPARATUS WITH MULTI-TOUCH CAPABILITY

CROSS REFERENCE TO RELATED APPLICATIONS

This application is a continuation of U.S. application Ser. No. 13/416,940 (now U.S. Pat. No. 9,201,546), filed Mar. 9, 2012, which is hereby incorporated by reference in its entirety.

FIELD OF THE INVENTION

This invention generally relates to touch sensor systems and, more particularly to, surface acoustic wave (SAW) touchscreens with multi-touch capability.

BACKGROUND OF THE INVENTION

Touch sensor systems, such as touchscreens or touch monitors, can act as input devices for interactive computer systems used for various applications, for example, information kiosks, order entry systems, video displays, etc. Such systems may be integrated into a computing device, thus providing interactive touch capable computing devices, including computers, electronic book readers, mobile communications devices, trackpads, and touch sensitive surfaces more generally.

Generally, touch sensor systems enable the determination of a position on the surface of a substrate via a user's touch of the surface. The touch substrate is typically made of some form of glass which overlies a computer or computing device display, like a liquid crystal display (LCD), a plasma display, etc. The touch sensor system is operatively connected to the device display so that it also enables the determination of a position on the device display and, moreover, of the appropriate control action of a user interface shown on the display. Alternatively, the touch substrate may be opaque such as for trackpad applications where the display may be located away from the touch sensor.

Touch sensor systems may be implemented using different technologies. Acoustic touch sensors, such as ultrasonic touch sensors using surface acoustic waves, are currently one of the major touch sensor technologies and many types of acoustic touch sensors now exist. For example, a "non-Adler-type" acoustic touch sensor uses a number of transducers per coordinate axis of the sensor substrate to spatially spread a transmitted surface acoustic wave signal and determine the touch surface coordinates by analyzing spatial aspects of the wave perturbation from a touch of the touch surface. An "Adler-type" acoustic touch sensor uses only two transducers per coordinate axis to spatially spread a transmitted surface acoustic wave signal and determine the touch surface coordinates by analyzing temporal aspects of a wave perturbation from a touch. For each axis of the substrate of the "Adler-type" sensor, one transducer at a respective peripheral surface generates surface acoustic wave pulses that propagate through the substrate across a perpendicular peripheral surface along which a first reflective grating or array is disposed. The first reflective array is adapted to reflect portions of a surface acoustic wave perpendicularly across the substrate along plural parallel paths to a second reflective array disposed on the opposite peripheral surface. The second reflective array is adapted to reflect the surface acoustic wave along the peripheral surface to a second transducer at a respective perpendicular peripheral surface where the wave is received for processing. The reflective arrays associated with the X axis are perpendicular to the reflective arrays associated with the Y axis so as to provide a grid pattern to enable two-dimensional coordinates of a touch on the substrate to be determined. Touching the substrate surface at a point causes a loss of energy by the surface acoustic waves passing through the point of touch. This is manifested as an attenuation of the surface acoustic waves. Detection circuitry associated with each receiving transducer detects the attenuation as a perturbation in the surface acoustic wave signal and performs a time delay analysis of the data to determine the surface coordinates of a touch on the substrate. This type of sensor is shown in FIG. 1 and described in more detail below.

Historically, the operative elements of an acoustic touch sensor, i.e., the transducers and reflective arrays, which are on the front surface of the substrate, have been covered and hidden from view by a protective bezel provided by the housing of the touch sensor or the device integrating the sensor. Current trends eliminate the bezel in favor of flush surroundings of touch area, even for larger-sized devices. Moreover, possible future applications of touch technology, such as turning passive objects like glass table tops into touch input devices and endowing robots with a sense of touch in their exterior shells, further motivate moving the operative elements from the exterior touch sensing surface of the touch substrate to the protected and hidden interior surfaces of the substrate. Acoustic touch sensors may utilize a rounded-substrate-edge approach to obtain such a zero-bezel or bezel-less design. This type of sensor is also described in more detail below.

Recently, acoustic touch sensors having multi-touch capability have been introduced into the commercial marketplace. Multi-touch capability is generally defined as the ability of a touch sensor to sense or recognize two or more (i.e., multiple) simultaneous touch points. Multiple simultaneous touch points include, for example, pinching gestures, parallel line swipes, and pivoting movements. To date, acoustic touch sensors, such as the IntelliTouch™ Plus touch sensors by Tyco Electronics Corporation have been able to deliver dual touch performance. Certain other touch technologies are even providing higher levels of multi-touch performance. The competition between the different technologies and the increase of system applications using multi-touch is now increasing the expectation and demand by users and designers for good touch performance not only for dual touches but also for three or more simultaneous touches.

A difficulty for acoustic touch sensors to support two or more simultaneous touches rests on such sensors not being able to acquire sufficient, clear coordinate information to match respective X coordinates with the respective corresponding Y coordinates of the multiple touches. The difficulties increase as the number of simultaneous touches increases.

SUMMARY OF THE INVENTION

The present invention obviates the above problems by providing an acoustic touch apparatus that distinguishes simultaneous touches, comprising a substrate that is adapted to utilize a transfer of surface acoustic waves, through the substrate, between opposite surfaces of the substrate to vary touch sensitivity along a respective acoustic path across a substrate touch region and acoustic transducers that are adapted to transmit and receive surface acoustic waves travelling on the opposite substrate surfaces, said substrate touch region providing additional signal information of touch responses of receiving transducers sufficient to permit the apparatus to determine an axis coordinate of a respective touch on the substrate touch region. The additional signal information may comprise a comparison of the touch responses of receiving transducers with non-touch responses of the receiving transducers. Alternatively, the additional signal information may comprise a comparison of the touch responses of receiving transducers with non-touch responses of the receiving transducers.

The present invention also provides an acoustic touch apparatus, comprising: a substrate that has top and bottom surfaces; a transmitting and receiving acoustic wave transducer pair on the top surface that is adapted to transmit and receive surface acoustic waves therebetween across a touch region on the top surface and to produce a touch response signal for a touch on the touch region; a transmitting and receiving acoustic wave transducer pair on the bottom surface that is adapted to transmit and receive surface acoustic waves therebetween, said substrate being adapted to propagate surface acoustic waves along each surface and to transfer, through the substrate, surface acoustic waves between the surfaces sufficient to enable a touch on the top surface to produce a touch response signal by the bottom surface transducer pair; and a controller that operates on the touch response signals and non-touch response signals produced by each of the bottom surface transducer pair and the top surface transducer pair and determines positional information of a touch on the touch region from the response signals.

The controller may operate on the response signals to determine the top and bottom touch sensitivity along an acoustic path across the touch region. The top and bottom sensitivity may be represented by the reduction in amplitude of the touch response signal to the non-touch response signal for each of the bottom surface transducer pair and the top surface transducer pair. Further, the controller may determine positional information of a touch by comparing the amplitude reductions of the touch response of the bottom surface transducer pair to the touch response of the top surface transducer pair. Alternatively, the controller may determine positional information of a touch by applying the following relation: $b(d)/t(d)=\{b(L/2)/t(L/2)\} \cdot d \cdot (L-d)/(L/2)^2$, where L is the distance between the transducers in a respective transducer pair on the top and bottom surfaces; b(d) is the amplitude reduction of the touch response for a touch at distance d by the bottom surface transducer pair; and t(d) is the amplitude reduction of the touch response for a touch at distance d by the top surface transducer pair.

The substrate may be adapted to propagate surface acoustic waves along each surface and to transfer, through the substrate, surface acoustic waves between the surfaces sufficient to enable a touch on the top surface to produce a respective touch response signal between the top surface transmitting transducer to the bottom surface receiving transducer, and the bottom surface transmitting transducer to the top surface receiving transducer. In such case, the top and bottom sensitivity may be represented by the reduction in amplitude of the touch response signal to the non-touch response signal between the bottom surface transmitting transducer to the top surface receiving transducer, and the top surface transmitting transducer to the bottom surface receiving transducer. Further, the controller may determine positional information of a touch by comparing the amplitude reductions of the touch response of the bottom surface transmitting transducer to the top surface receiving transducer, to the touch response of the top surface transmitting transducer to the bottom surface receiving transducer. Further, the controller may determine positional information of a touch by further analyzing the amplitude changes of the touch response of the bottom surface transducer pair and of the touch response of the top surface transducer pair. The controller may also determine positional information of overlapping touches on the top surface by utilizing a comparison of the touch response signal between the top surface transmitting transducer to the bottom surface receiving transducer with the touch response signal between the bottom surface transmitting transducer to the top surface receiving transducer for each touch to distinguish between the signals of the touches and the respective positional information.

The present invention also provides an acoustic touch sensor system having multi-touch capability, comprising: a substrate that is capable in a peripheral region to propagating surface acoustic waves along substrate surfaces and in a central region to permit top-bottom oscillation of the surface acoustic waves from the one of the surfaces to the other surface through the substrate, said substrate having a top surface, a bottom surface, and a curved connecting surface formed between said top surface and said bottom surface; a first transmitting element disposed on an outside area of the peripheral region of the bottom surface and a second transmitting element disposed on an inside area of the peripheral region of the bottom surface; a first receiving element disposed on an outside area of the peripheral region of the bottom surface and a second receiving element disposed on an inside area of the peripheral region of the bottom surface, the set of transmitting elements and the set of receiving elements disposed on opposing sides of the central region of the substrate; and a controller that excites the first and second transmitting elements to generate respective surface acoustic waves and that analyzes the respective signals received by the first and second receiving elements, said substrate forming at least respective wave paths from the first transmitting element, around the proximate curved connecting surface, through the substrate in the central region and to the second receiving element; and from the second transmitting element, through the substrate in the central region, around the proximate curved connecting surface and to the first receiving element.

Each transmitting element may comprise a transmitting acoustic wave transducer and an associated transmitting reflective array and each receiving element may comprise a receiving acoustic wave transducer and an associated receiving reflective array. Also, the system may further comprise another set of transmitting elements and another set of receiving elements disposed on the other two opposing sides of the central region of the substrate in a similar manner as the respective first sets, each pair of sets being utilized to define a respective axis coordinate of the front surface. Also, the substrate may further have a damping material separating the peripheral region into outside and inside areas. Also, the substrate may be adapted to provide non-symmetrical top and bottom surfaces acoustic waves in a peripheral region in order to propagate surface acoustic waves.

Also, each receiving element may be adapted to produce a touch response signal for a respective touch on the top surface and the controller analyzes the touch response signals and non-touch response signals produced by each receiving element to determine axis coordinate information of the touch on the top surface from the response signals. In such case, the controller may analyze the ratios of signal losses, or the ratios of signal level changes, of touch response signals to determine axis coordinate information of the touch on the top surface. Alternatively, the controller may analyze the delay times of touch response signals, and the ratios of signal losses of touch response signals in the top-bottom oscillation-based signals to determine axis coordinate information of the touch on the top surface. In such case, certain of the axis coordinate information may be dependent upon the ratios of signal losses of touch response signals in the top-bottom oscillation-based signals; and the distance between respective transmitting and receiving elements on the top and bottom surfaces. Another set of transmitting elements and another set of receiving elements may be disposed on the other two opposing sides of the central region of the substrate in a similar manner as the respective first sets, each pair of sets being utilized to define a respective axis coordinate of the front surface.

Advantageously, the present invention provides an acoustic touch sensor with sets of two to four signals providing the same time delay information on a coordinate perpendicular to the acoustic path through the touch area and for which ratios of the touch sensitivity provide at least a rough measurement of a coordinate parallel to the acoustic path through the touch area. Thus, for example, a set of X signals not only provides a precise X coordinate but also a rough Y coordinate thus removing the usual X-Y association ambiguity problem. Furthermore, the set of X signals can be used to separate overlapping shadows of pairs of touches with similar X coordinates via identifying minimum width linear combinations of shadows in different members of the set of X signals. The present invention treats sets of Y signals similarly.

BRIEF DESCRIPTION OF THE DRAWINGS

For a better understanding of the present invention, reference is made to the following description of exemplary embodiments thereof, and to the accompanying drawings, wherein:

FIG. 3b is a simplified transparent view of the substrate of the sensor of FIG. 3a;

FIG. 4b is a back plan view of the substrate of the sensor of FIG. 4a;

DETAILED DESCRIPTION OF SPECIFIC EMBODIMENTS OF THE INVENTION

Figure 1:
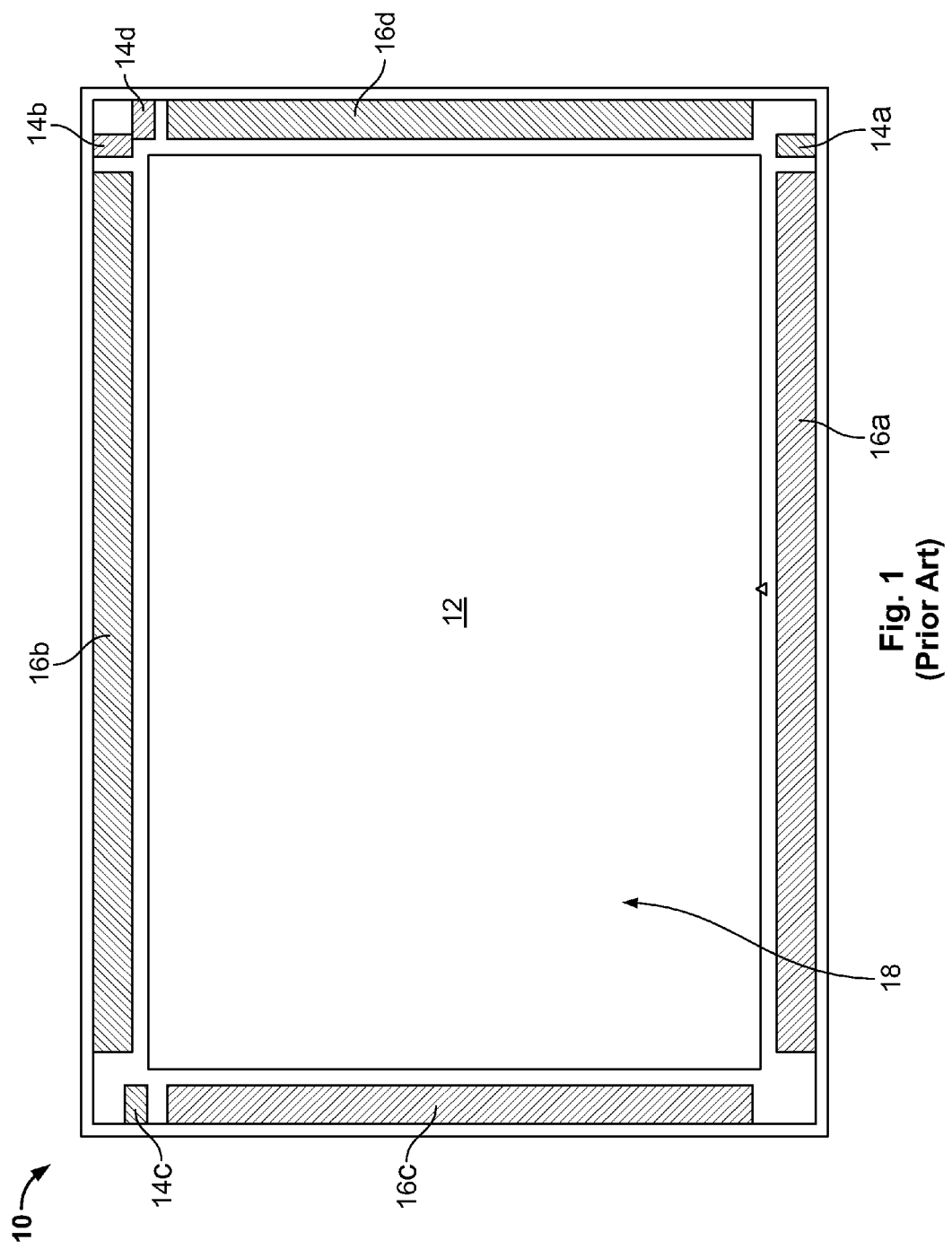
FIG. 1 is a front plan view of a substrate of a typical surface acoustic wave touch sensor.

FIG. 1 shows a front plan view of a substrate 12 of a typical "Adler-type" surface acoustic wave touch sensor 10. As noted above, the touch sensor 10 uses two transducers per coordinate axis to spatially spread a transmitted surface acoustic wave signal and determine the touch surface coordinates by analyzing temporal aspects of a wave perturbation from a touch. Accordingly, for the X coordinate axis, a first transmitting transducer 14a at a respective peripheral surface generates surface acoustic wave pulses that propagate through the substrate 12 across a perpendicular peripheral surface along which a first reflective grating or array 16a is disposed. The first reflective array 16a is adapted to reflect portions of a surface acoustic wave perpendicularly across the substrate 12 (across the so-called "the touch surface" 18) along plural parallel paths to a second reflective array 16b disposed on the opposite peripheral surface. The second reflective array 16b is adapted to reflect the surface acoustic wave along the peripheral surface to a first receiving transducer 14b at a respective perpendicular peripheral surface where the wave is received for processing. Similarly, for the Y coordinate axis, a second transmitting transducer 14c at a respective peripheral surface generates surface acoustic wave pulses that propagate through the substrate 12 across a perpendicular peripheral surface along which a third reflective grating or array 16c is disposed. The third reflective array 16c is adapted to reflect portions of a surface acoustic wave perpendicularly across the substrate 12 (i.e., the touch surface 18) along plural parallel paths to a fourth reflective array 16d disposed on the opposite peripheral surface. The fourth reflective array 16d is adapted to reflect the surface acoustic wave along the peripheral surface to a second receiving transducer 14d at a respective perpendicular peripheral surface where the wave is received for processing. The reflective arrays 16a, 16b associated with the X coordinate axis are perpendicular to the reflective arrays 16c, 16d associated with the Y coordinate axis so as to provide a grid pattern to enable two-dimensional coordinates of a touch on the substrate 12, and more specifically, the touch surface 18, to be determined.

Touching the touch surface 18 at a point causes a loss of energy by the surface acoustic waves passing through the point of touch. This is manifested as an attenuation of the surface acoustic waves. Detection circuitry associated with each receiving transducer 14b, 14d detects the attenuation as a perturbation in the surface acoustic wave signal and performs a time delay analysis of the data to determine the surface coordinates of a touch on the touch surface 18.

Varying the touch sensitivity along the acoustic path across the touch region of the substrate may be beneficial in acquiring additional coordinate information. In this way, the touch sensor may be able to distinguish between real touch points and "ghost touch points" (i.e., X and Y coordinate pairs corresponding to a location with no physical touch but rather an X coordinate from one true touch mismatched with a Y coordinate of a different true touch) in processing the touch signals. This would enable the detection circuitry to match a respective X coordinate with a respective corresponding Y coordinate for each touch point of multiple simultaneous touches.

One method of modulating the touch sensitivity along the acoustic path along the touch region would be to utilize a unique property of surface acoustic waves generated for an acoustic touch sensor. Specifically, surface acoustic waves propagating on one surface of a substrate may transfer, under certain circumstances, through the substrate to the other surface. Generally, this transfer can occur when the depth of the substrate is sufficiently small. The current standard used in acoustic touch sensors is approximately 3 mm, thick substrate. It has been previously reported that the typical substrate (i.e., soda-lime glass) of an acoustic touch sensor, using the standard transmitting frequency of 5.53 MHz, should be at least 2 mm thick for propagating surface acoustic waves, that is, at least 3.5 Rayleigh wavelengths thick. These propagating surface acoustic waves are maintained on the substrate surface of the transmitting transducer, much as surface waves on the ocean are maintained on the ocean surface, although in both cases wave motion and power penetrates some depth into the wave medium of glass or water. However, at certain smaller thicknesses, the surface acoustic wave energy becomes transferred (actually oscillates) between the two opposing surfaces of the substrate. This is further described in commonly-owned U.S. patent application Ser. No. 13/416,871 entitled, "Acoustic Touch Apparatus with Variable Thickness Substrate," concurrently filed in the name of David Hecht and Joel Kent, which is hereby incorporated by reference.

Briefly, the transmitting transducers of an acoustic touch sensor normally produce a surface acoustic wave which is typically termed a Rayleigh wave. A Rayleigh wave has vertical and transverse wave components with substrate particles moving along an elliptical path in a vertical plane including the axis of wave propagation, and wave energy decreasing with increasing depth in the substrate. Mathematically, Rayleigh waves exist only in semi-infinite media. In plates or substrates of finite thickness, such as those used in acoustic touch sensors, the waves are more precisely termed quasi-Rayleigh waves, each of which comprises a superposition of equal portions of the lowest order symmetric and anti-symmetric Lamb wave modes $S_0$ and $A_0$. For substrates of thickness of interest for acoustic touch sensors, the $S_0$ Lamb wave mode is essentially a surface acoustic wave on the transmitting transducer (or top) surface simultaneous with an in-phase surface acoustic wave on the opposing (or bottom) surface, while the $A_0$ Lamb wave mode is similar except the surface acoustic wave on the bottom surface is out of phase with the surface acoustic wave on the top surface. A quasi-Rayleigh wave on the top surface is a positive superposition of the two wave modes (i.e., $S_0+A_0$) which cancels the surface acoustic wave on the bottom surface and a quasi-Rayleigh wave on the bottom surface is a negative superposition of the two wave modes (i.e., $S_0-A_0$) which cancels the surface acoustic wave on the top surface. A transmitted (or launched) pure $S_0$ or $A_0$ wave will forever remain a $S_0$ or $A_0$ wave, respectively, since each is a true mode of vibration. In contrast, neglecting glass attenuation, a launched top quasi-Rayleigh wave, which is not a true mode of vibration, will eventually convert into a bottom quasi-Rayleigh wave and the two waves will continue to oscillate back and forth in a beat pattern. This is because the wave modes $S_0$ and $A_0$ have slightly different phase velocities so that the $A_0$ phase relative to the $S_0$ phase continually changes and with enough distance $S_0+A_0$ becomes $S_0-A_0$ and then back again, repeatedly in a beat pattern. This is an example of the classical coupled oscillator system that occurs in many contexts. The result is surface wave energy is transferred back and forth between the top and bottom surfaces of the substrate, as indicated above.

Figure 2:
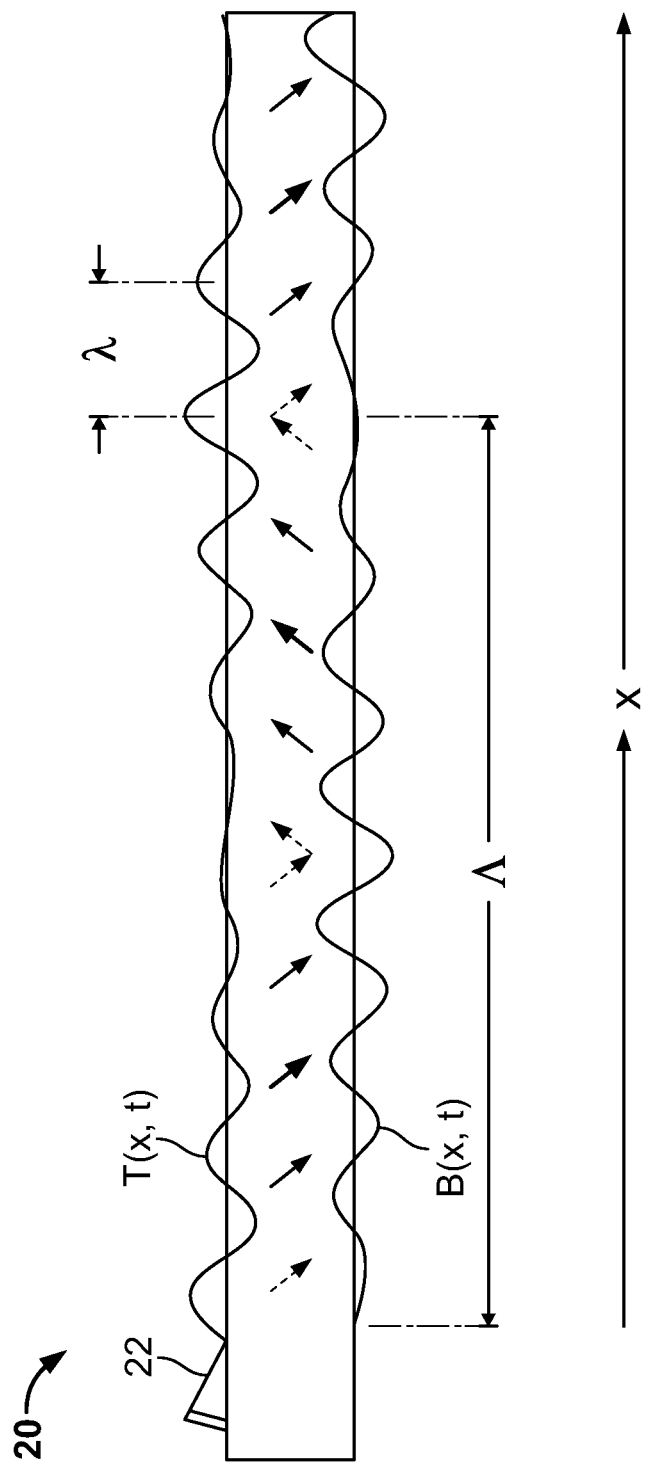
FIG. 2 is an illustration of top-bottom oscillation phenomenon in a thin substrate.

FIG. 2 is an illustration of this top-bottom oscillation for a thin substrate 20 that may be used in an acoustic touch sensor. Neglecting attenuation effects, if "x" is the distance of propagation away from a wedge transducer 22 continuously excited at frequency f, the wave amplitude (e.g. vertical particle displacement) on the top surface T(x,t) and the wave amplitude on the bottom surface B(x,t) will vary with position and time as follows, where λ is the Rayleigh wavelength at frequency f and Λ is a beat wavelength that characterizes the oscillation of the Rayleigh wave between surfaces:

$$T(x,t)=\text{Constant}\cdot\cos(\pi x/\Lambda)\cdot\cos(2\pi x/\lambda-2\pi f\cdot t) \text{ and}$$

$$B(x,t)=\text{Constant}\cdot\sin(\pi x/\Lambda)\cdot\sin(2\pi x/\lambda-2\pi f\cdot t).$$

It is important to note that, in half a beat wavelength, Λ/2, a Rayleigh wave on one surface is completely transferred to the other surface. The time averaged power transfer between Rayleigh waves on the two surfaces is schematically represented by the solid line arrows and is proportional to $\sin(2\pi x/\Lambda)$, where a positive algebraic sign signifies power transfer from top to bottom and a negative sign signifies power transfer in the other direction. Where either the top or bottom amplitude is small, the power transfer is also small.

The phenomenon of top-bottom oscillation is conventionally regarded as a problem to avoid in acoustic touch sensor design so as to maintain propagating surface acoustic waves on a respective surface. And for this purpose, the touch substrate is designed as a rule to be at least 3 or 4 Rayleigh wavelengths thick to essentially eliminate top-bottom oscillations (although there may be other ways like the use of substrate coatings to suppress the oscillations). A substrate of 3.5 Rayleigh wavelengths is generally sufficient to suppress top-bottom oscillations and a substrate thickness of 5.5 Rayleigh wavelengths is sufficient to confidently eliminate top-bottom oscillations for all plausible engineering situations.

The key engineering parameters to consider are the transmitting frequency, the distance across the substrate (i.e., the top-bottom oscillation distance) required for a top surface acoustic wave to convert into a bottom surface acoustic wave (and vice versa), the thickness of the substrate, and the acoustic path lengths of the touch sensor. The composition of the substrate is also a factor. Generally, though, the thinner the substrate, the shorter the distance for this top-to-bottom energy transfer. If the top-bottom oscillation distance is then comparable or short compared to the acoustic path lengths, then the surface wave energy will not be maintained on the top surface. Consequently, the surface acoustic wave launched on one surface of the substrate will appear on the other surface.

The surface acoustic wave energy that is propagating across the touch region surface transfers between the top and bottom surfaces thus changing the fraction of surface acoustic wave energy at the touch region surface. This results in a modulation of touch sensitivity along the acoustic path across the touch region surface. It would be advantageous to utilize this process to acquire additional and clear coordinate information of multiple simultaneous touches for acoustic touch sensors.

Figure 3A:
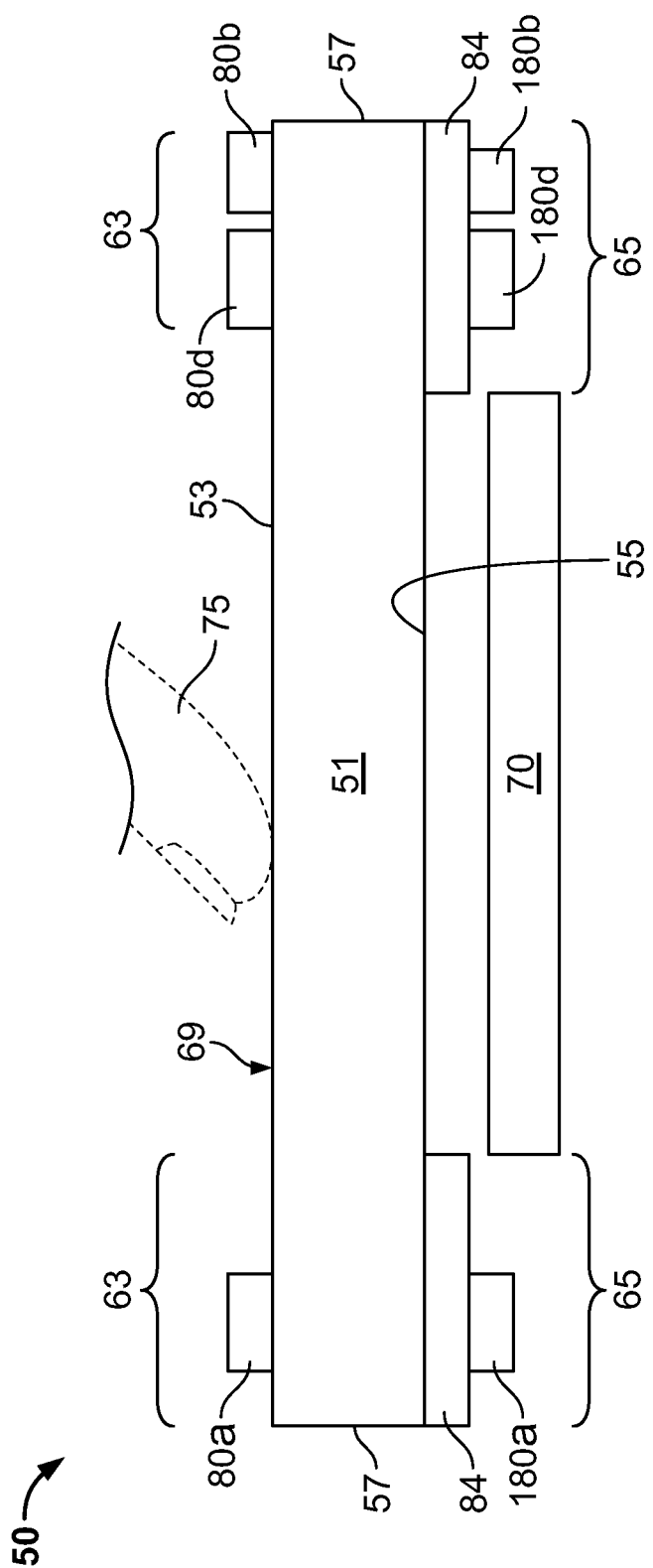
FIG. 3a is a side perspective of an acoustic touch sensor constructed in accordance with the present invention.

FIG. 3a shows a simplified side perspective of an acoustic touch sensor 50 constructed in accordance with the present invention. The touch sensor 50 is similar in construction to the sensor 10 of FIG. 1 with the addition of an identical transducer-array arrangement on the opposite side of the substrate 51. As described in further detail below, this configuration in combination with the top-bottom oscillation process will enable more signals to be acquired for each touch point. The touch sensor 50 comprises a substrate 51 with a front surface 53, a back surface 55, and connecting end surfaces 57 joining the peripheral region 63 of the front surface 53 with the peripheral region 65 of the back surface 55. The region on the front surface 53 between the portions of the peripheral region 63 is the touch region or touch surface 69. The substrate 51 may be made of some form of glass (e.g., soda-lime glass) or other material which overlies a computer display or computing device display 70, like a liquid crystal display (LCD), a cathode ray tube (CRT), a plasma display, etc. (with an air gap normally therebetween). The composition of the substrate 51 is discussed in more detail below. An object 75 that touches the touch region 69 is shown as a finger, but it is recognized that touches sensed by the surface acoustic waves may include a stylus pressing against the front surface 53 directly or indirectly, through a cover sheet or like element, depending upon the application of the touch sensor 50.

Figure 3B:
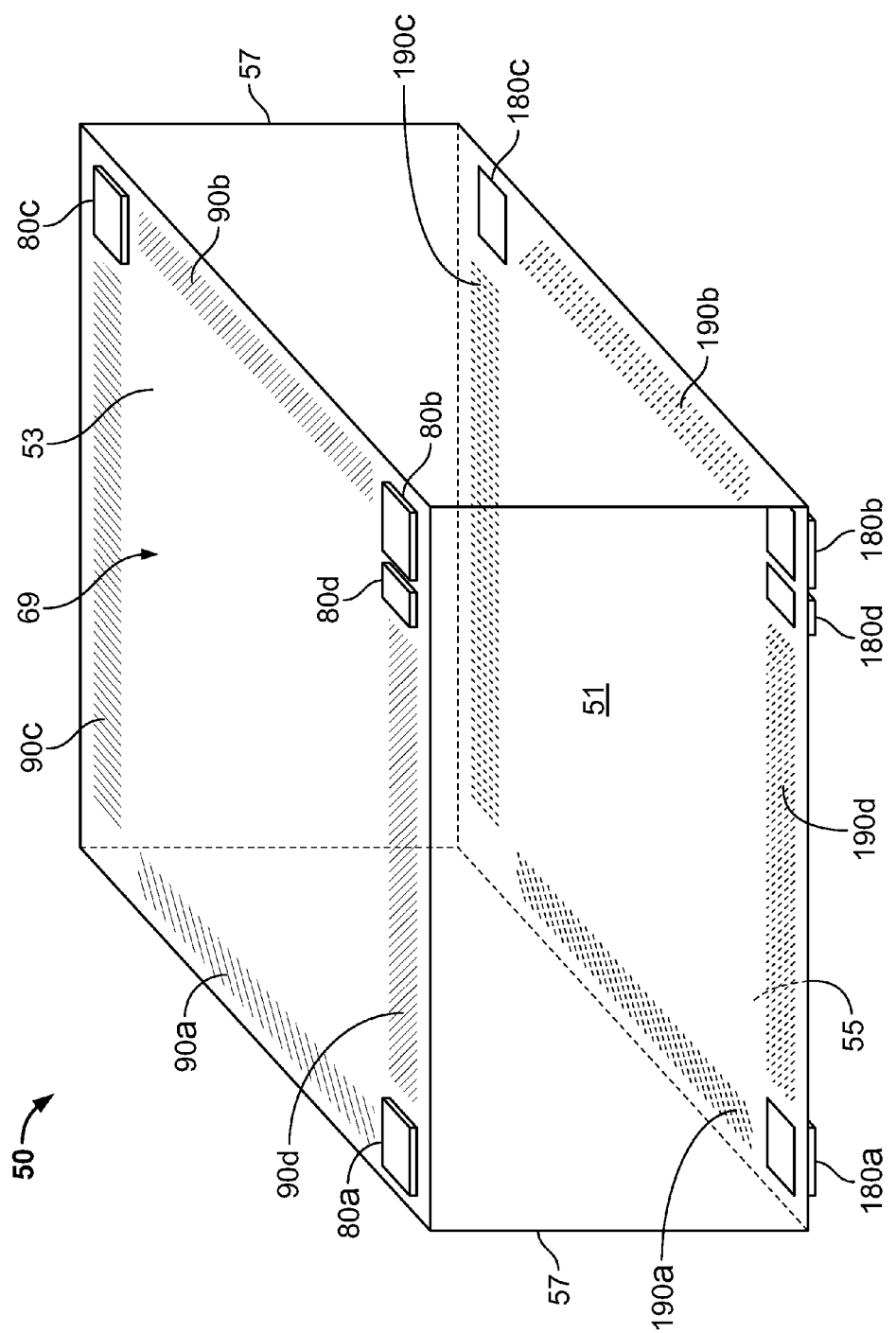

In this embodiment of the present invention, the touch sensor 50 takes on the architecture of an "Adler-type" acoustic touch sensor, as described above, that uses two transducers per coordinate axis to spatially spread a transmitted surface acoustic wave signal for the front surface 53 and two transducers per coordinate axis to spatially spread a transmitted surface acoustic wave signal for the back surface 55. FIG. 3b shows a simplified transparent view of the substrate 51 that illustrates the arrangement of the operative elements on the two surfaces 53, 55 of the sensor 50. For clarity, the thickness dimension of the substrate 51 is greatly exaggerated in the figure. The figure shows, in solid line, the operative elements for the front or top surface 53 and two transducers for one coordinate axis for the back or bottom surface 55 and, in dotted line, the remainder of the operative elements for the bottom surface 55. It is understood that the bottom surface 55 has the same layout for all of the transducers and reflective arrays as the top surface 53.

Specifically, the touch sensor 50 comprises acoustic transducers 80a, 80b, 80c, 80d that are provided in the peripheral region 63 of the top surface 53 (see also FIG. 3b). Note that the touch sensor 50 also comprises acoustic transducers 180a, 180b, 180c, 180d (see also FIG. 3b) that are provided on a border layer 84 of paint or ink in the peripheral region 65 of the bottom surface 55. The purpose of the border layer 84 is to suppress around the transducers (and along the associated arrays shown in FIG. 3b) oscillation of surface acoustic waves between top and bottom surfaces where it is not desired; this is discussed in more detail below. For the top X-axis coordinate, a first transmitting transducer 80a that generates surface acoustic waves is situated on one side, the top or front surface 53, of the substrate 51 and a corresponding first receiving transducer 80b that receives the respective generated surface acoustic waves is situated on the opposite side of the top or front surface 53. The first transmitting transducer 80a generates surface acoustic wave pulses that propagate through the substrate 51 across the peripheral region 63 surface along which a first reflective grating or array 90a is disposed. The first reflective array 90a is adapted to reflect portions of a surface acoustic wave perpendicularly across the front surface 53 (across the touch surface 69) along plural parallel paths to a second reflective array 90b disposed on the opposite peripheral region 63 surface. The second reflective array 90b is adapted to reflect the surface acoustic wave along the peripheral region 63 surface to the first receiving transducer 80b where the wave is received for processing. Similarly, for the top Y coordinate axis, a second transmitting transducer 80c generates surface acoustic wave pulses that propagate through the substrate 51 across the peripheral region 63 surface along which a third reflective grating or array 90c is disposed. The third reflective array 90c is adapted to reflect portions of a surface acoustic wave perpendicularly across the front surface 53 (i.e., the touch surface 69) along plural parallel paths to a fourth reflective array 90d disposed on the opposite peripheral region 63 surface. The fourth reflective array 90d is adapted to reflect the surface acoustic wave along the peripheral region 63 surface to the second receiving transducer 80d where the wave is received for processing. The propagating surface acoustic waves are respectively generated and received in each of the two planar coordinate axes (X and Y) of the front surface 53 of the substrate 51. The transducers 80a, 80b, 80c, 80d are operably coupled to a controller or control system (not shown), which may be part of a system processor in some embodiments, that is also operably coupled to the display 70. The controller or control system drives the operation of the transducers 80a, 80b, 80c, 80d and measures the signals from such transducers to determine the touch coordinates, which are then provided to an operating system and software applications to provide the required user interface with the display 70.

The bottom surface 55 has the same layout for all of the transducers and reflective arrays as the top surface 53 and which operate in similar fashion. FIG. 3b shows, in solid line, a first transmitting transducer 180a and a corresponding first receiving transducer 180b and, in dotted line, the first and second reflective arrays 190a, 190b for the X coordinate axis for the bottom surface 55. The figure further shows, in dotted line, a second transmitting transducer 180c and, in solid line, a corresponding second receiving transducer 180d and the third and fourth reflective arrays 190c, 190d for the Y coordinate axis for the bottom surface 55.

The substrate 51 is configured to facilitate surface acoustic waves propagating on one surface to transfer, through the substrate 51, to the other surface. As noted above, several parameters make this transfer possible, including the transmitting frequency, the distance across the substrate (i.e., the top-bottom oscillation distance or beat wavelength) required for a top surface acoustic wave to convert into a bottom surface acoustic wave (and vice versa), the thickness of the substrate, the acoustic path lengths of the touch sensor, and the composition of the substrate. It has been demonstrated that the thinner the substrate, the shorter the distance required for this top-to-bottom energy transfer, if other parameters are generally standard (for example, a transmitting frequency of 5.53.MHz, a substrate composition of either soda-lime glass or B270® glass from Schott Glass, and acoustic path lengths of a typical touch sensor). If the top-bottom oscillation distance (beat wavelength) is then comparable or short compared to the acoustic path lengths, then the surface wave energy will not be maintained on a respective signal-launched surface. Consequently, the surface acoustic wave launched on one surface of the substrate will appear on the other surface. Rapid top-bottom oscillation may be observed at very small glass thicknesses, for example, 1.1 mm for soda-lime glass substrate (with a beat wavelength of 47.5 mm at 5.53 MHz) and 1.0 mm for B270® glass substrate (with a beat wavelength of 36.5 mm at 5.53 MHz). For a substrate composition of soda-lime glass, the surface wave energy will not transfer at substrate thicknesses greater than 2 mm as previously reported, with experimental indications that 1.8 mm would be sufficient for relatively slow energy transfer. For a substrate composition of B270® glass, there are experimental indications that a substrate thickness of 1.35 mm would be sufficient for a moderate rate of energy transfer.

Figure 3C:
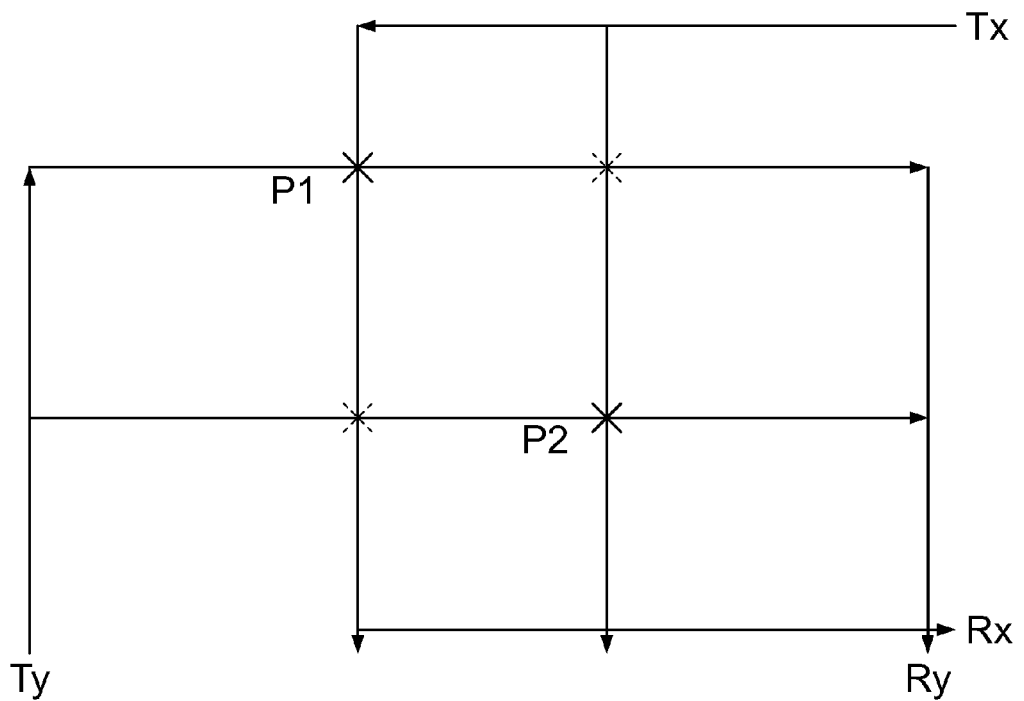
FIG. 3c is a schematic view of a touch surface of a substrate of a typical acoustic touch sensor with sample multiple touch points indicated.

FIG. 3c is a schematic view of a touch surface of a substrate of a typical "Adler-type" acoustic touch sensor with sample multiple touch points indicated. The figure shows, for the X-axis coordinate, the first transmitting transducer (Tx) and the corresponding first receiving transducer (Rx) and, for the Y-axis coordinate, the second transmitting transducer (Ty) and the corresponding second receiving transducer (Ry). The figure also shows a first touch point P1 and a second touch point P2 on the touch surface. In a one-touch operation, the sensor uses two surface acoustic wave signals (Tx→Rx from the first transducer pair and Ty→Ry from the second transducer pair) to determine the X-axis coordinate and the Y-axis coordinate of the single touch. In a multi-touch operation, the respective receiving transducer may not have coordinate information to distinguish between real touch points P1, P2 and "ghost touch points". For example, the first receiving transducer Rx receives two X-axis perturbations, caused by the two touches P1, P2, in the surface acoustic wave signal from the first transmitting transducer Tx and the second receiving transducer Ry receives two Y-axis perturbations, caused by the two touches P1, P2, in the surface acoustic wave signal from the second transmitting transducer Ty. The controller or control system measures the signals from the transducers but may be limited in determining the matches of the respective X coordinates with the respective corresponding Y coordinates of the two touches P1, P2.

Specifically, the controller may falsely associate the X coordinate of the first touch point P1 with the Y coordinate of the second touch point P2 leading to a ghost touch position indicated by the lower left dotted "X" in FIG. 3c and may falsely associate the Y coordinate of the first touch point P1 with the X coordinate of the second touch point P2 leading to a ghost touch position indicated by the upper right dotted "X" in FIG. 3c. If the X signal corresponding to acoustic paths from the first transmitting transducer Tx to the first receiving transducer Rx not only provided precise information on the X coordinate of the first touch point P1, but also provided even a rough measure of the Y coordinate of the first touch point P1, it would be clear which precise Y coordinate from the Y signal between the second transducers Ty, Ry to associate with the precise X coordinate of the first touch point P1. Similar comments apply to the second touch point P2 as well as to the usefulness of even a rough measure of the X coordinate from Y signals. As will be explained below, the touch sensor 50 of FIGS. 3a and 3b provide such a capability and hence enable resolution of the ambiguity problem presented in FIG. 3c. If there are three or more simultaneous touches, the risks of false associations of X and Y coordinates from different touches increase in conventional sensor designs and the need for new methods, as described herein, to resolve such ambiguities becomes more urgent.

Figure 3D:
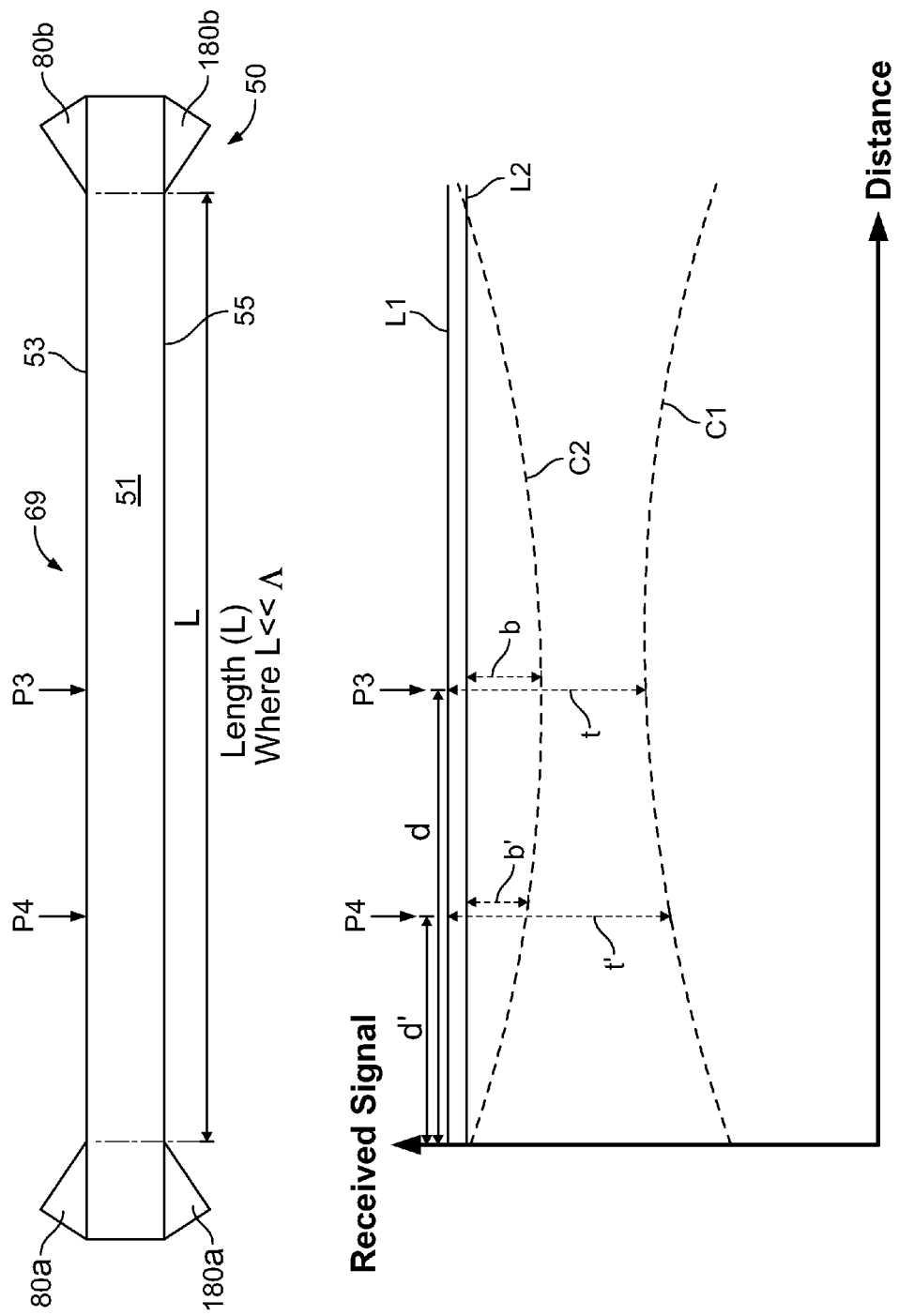
FIG. 3d is a simplified side view of the substrate of the sensor of FIG. 3a with
a corresponding chart of a touch response.

FIG. 3d shows a simplified side view of the touch sensor 50 with a corresponding chart of a touch response in illustrating the specific operation of the sensor 50. The figure shows, for the top X-axis coordinate, the first transmitting transducer 80a that generates surface acoustic waves situated on one side of the substrate 51 and the corresponding first receiving transducer 80b that receives the respective generated surface acoustic waves situated on the opposite side. The bottom surface 55 has the same layout, i.e., the first transmitting transducer 180a and the corresponding first receiving transducer 180b. The respective reflective arrays are not shown for ease of visualization. There is a distance L between each of the transmitting transducers and the respective corresponding receiving transducer (i.e., the acoustic path length though the touch area), where the distance L is substantially smaller in value than the top-bottom oscillation distance (i.e., the beat wavelength $\Lambda$) of the surface acoustic waves generated by a respective transmitting transducer. The accompanying chart correlates the distance d from a transmitting transducer, or more properly its corresponding array (not shown), to a touch with the received signal voltage at each receiving transducer. The top first receiving transducer 80b produces a non-touch response level L1 and a touch response curve C1 (the signal from the top transducer pair) and the bottom first receiving transducer 180b produces a non-touch response level L2 and a touch response curve C2 (the signal from the bottom transducer pair). Nominally, the non-touch response levels L1, L2 could be identical, but this is not required as attenuation due to touches may be measured as a percentage or dB change relative to the non-touch level.

Due to the phenomenon illustrated in FIG. 2, some of the surface acoustic wave power transmitted between the top transmitting transducer 80a is transferred to the bottom surface 55 and back up to the top surface 53 before reaching the top receiving transducer 80b. This effect of the surface acoustic wave "going underground" particularly around the center of the touch region 69 results in reduced attenuation from touches on the top surface 53, resulting in the curvature of touch response C1. Similarly, the phenomenon illustrated in FIG. 2 leads to some of the acoustic energy between the bottom transmitting transducer 180a and the bottom receiving transducer 180b "popping up" and appearing at the top surface 53, resulting in sensitivity to a touch on the top surface 53 as represented by the shape of the touch response C2.

As the transmitting transducers 80a, 180a are generating or launching surface acoustic waves across the substrate 51, an object may touch the touch region 69 of the top surface 53 at a first touch point P3 at a first distance d and at a later time the object may touch the touch region 69 of the top surface 53 at a second touch point P4 at a second distance d'. The distances d and d' correspond to the respective Y-axis coordinate of each touch point.

The first touch point P3 generates a signal loss t (from the top non-touch response level L1) that the top first receiving transducer 80b detects (and forms part of the touch response curve C1) and a signal loss b (from the bottom non-touch response level L2) that the bottom first receiving transducer 180b detects (and forms part of the touch response curve C2). The second touch point P4 generates a signal loss t' (from the top non-touch response level L1) that the top first receiving transducer 80b detects (and forms part of the touch response curve C1) and a signal loss b' (from the bottom non-touch response level L2) that the bottom first receiving transducer 180b detects (and forms part of the touch response curve C2). The C1 signal loss t for the first touch point P3 which closer to the center is less than the C1 signal loss t' for the second touch point P4 which is closer to an end because more of the top propagating surface acoustic wave has "gone underground" to the bottom surface 55 at the center. In contrast, the C2 signal loss b for the first touch point P3 is more than the C2 signal loss b' for the second touch point P4 because more of the bottom propagating surface acoustic wave "pops up" to the top surface 53 at the center. These amplitude reductions from the respective non-touch responses respectively represent top and bottom touch sensitivity along the acoustic path, as noted above.

The controller or control system measures all of the signals from the receiving transducers 80b, 180b and operates on the signals, such as implementing an algorithm which compares, for a respective touch point (e.g., touch point P4), the respective ratios of the amplitudes of the non-touch responses from the bottom transducer pair and the top transducer pair (e.g., L2/L1) and the amplitudes of the touch responses from the bottom transducer pair and the top transducer pair (e.g., b/t and b'/t'). The latter may be referred to as the ratio of the bottom to top touch sensitivity. With this additional signal information for each touch point, in addition to the precise X-axis coordinate information from time delay information, information on the orthogonal Y coordinate may be determined for a respective touch point on what is conventionally regarded the X-signal acoustic path. Hence, the controller or control system may then match the precise X-axis coordinate with precise Y-axis coordinates determined by what is conventionally regarded as the Y-signal acoustic path by rejecting any candidate precise Y coordinate that is not compatible with the Y coordinate determination from the X-signal acoustic path.

An exemplary algorithm, in reduced form, that may be implemented by the sensor 50 for this purpose is $b(d)/t(d) = \{b(L/2)/t(L/2)\} \cdot d \cdot (L-d)/(L/2)^2$, where L is the distance between the transducer pairs on the top and bottom surfaces of the substrate as described above; b(d) is the signal loss for a touch at distance d by the bottom transducer pair as described above; and t(d) is the signal loss for a touch at distance d by top transducer pair as described above. For a touch at the center, d=L/2, the above equation reduces to the correct but trivial relation b(L/2)/t(L/2)=b(L/2)/t(L/2). For touches at the extreme ends, namely d=0 or d=L, the above equation reduces to zero as expected from touch response curve C2. For L small compared to the beat wavelength Λ, the shape of ratio b/t is well approximated by a parabola with a maximum at the center as is well represented by the above formula. From a measured value of the ratio b(d)/t(d), a value or values of d may be determined that satisfy the above equation, hence providing information about the orthogonal coordinate Y from what are nominally the X-signals. Similarly, the sensor 50 is configured and operated to determine orthogonal coordinate X information from what are nominally Y-signals. Thus, a ratio of touch sensitivity along the acoustic path provides an additional signal (or coordinate information) for the detection circuitry of the sensor 50 for determining a respective coordinate of each touch point. Note that the sensor 50 obtains generally two values of distance d for each value of the ratio of the bottom to top touch sensitivity b/t; the embodiment of FIG. 3e avoids this complication.

Figure 3E:
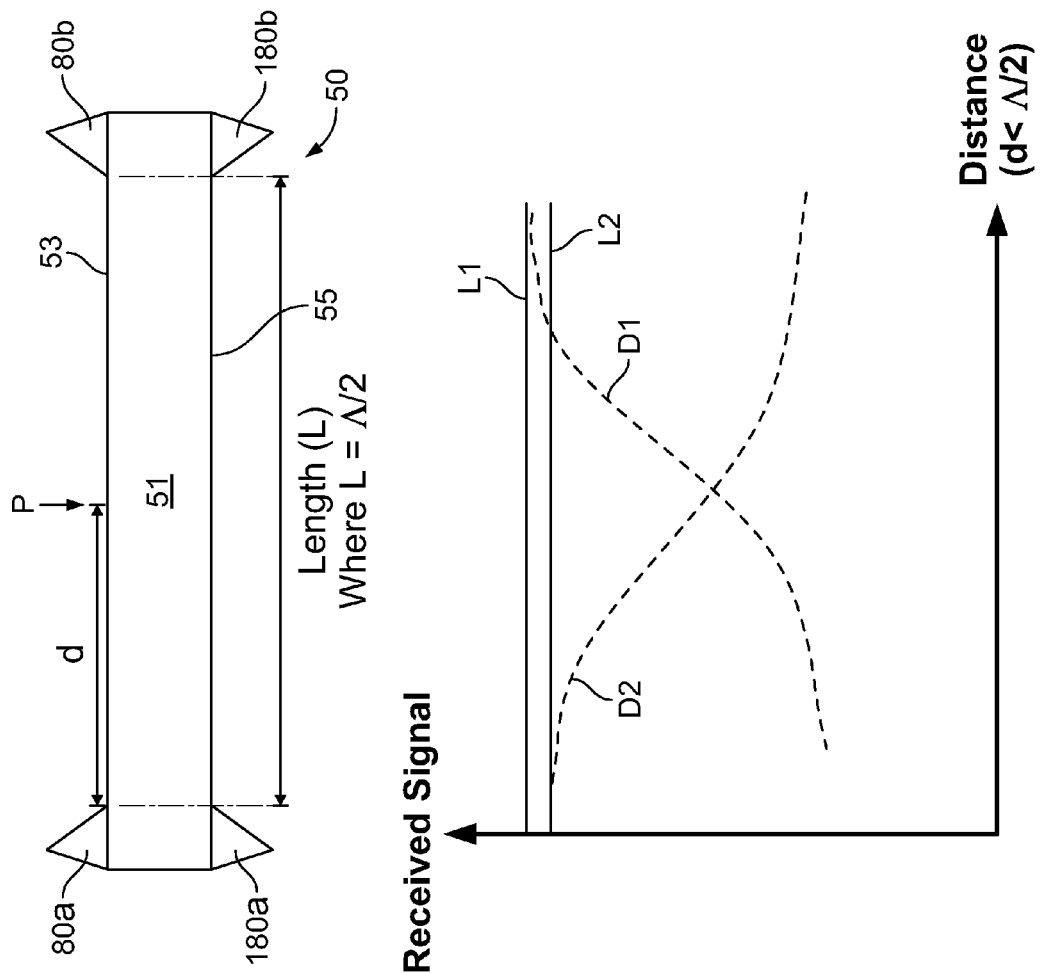
FIG. 3e is a simplified side view of another substrate of the sensor of FIG. 3a with a corresponding chart of a touch response.

FIG. 3e is a simplified side view of a second substrate of the sensor 50 of FIG. 3a with a corresponding chart of a touch response. Like the previous figure, FIG. 3e shows, for the Y-axis coordinate, the first transmitting transducer 80a that generates surface acoustic waves situated on one side of the substrate 51 and the corresponding first receiving transducer 80b that receives generated surface acoustic waves situated on the opposite side. The bottom surface 55 has the same layout, i.e., the first transmitting transducer 180a and the corresponding first receiving transducer 180b. The respective reflective arrays are not shown for ease of visualization. There is a distance L between each of the transmitting transducers and the respective corresponding receiving transducer (i.e., the acoustic path length across the touch area). The accompanying chart correlates the distance d of a touch from the transmitting transducers 80a, 180a, or more properly from the corresponding transmitting arrays (not shown), with the received signal voltage at each receiving transducer. However, in this figure, the distance L is one-half of the top-bottom oscillation distance (i.e., the beat wavelength Λ) of the surface acoustic waves generated by a respective transmitting transducer.

Consequently, the configuration of the substrate 51 permits top-bottom oscillation to occur so that surface acoustic wave launched on one surface of the substrate will appear on the other surface via the energy transfer caused by the action of the Lamb wave modes $S_0$ and $A_0$. The bottom receiving transducer 180b produces a non-touch response level L1 and a touch response curve level D1 (the signal from the top first transmitting transducer to the bottom first receiving transducer Tt_x→Br_x) and the top receiving transducer 80b produces a non-touch response level L2 and a touch response curve level D2 (the signal from the bottom first transmitting transducer to the top first receiving transducer Bt_x→Tr_x). The sensor 50 operates in similar fashion for the respective Y-axis coordinate elements of the two surfaces 53, 55. Consequently, two ratios of touch sensitivity for a respective touch point P may be derived using a similar analysis as previously described: R1≈(Bt_x→Tr_x)/(Tt_x→Br_x) and R2≈(Bt_y→Tr_y)/(Tt_y→Br_y), providing a unique ratio (and additional coordinate information) for each axis coordinate. As seen in the figure, poor resolution of these ratios occurs at the ends of an acoustic path across the touch area while the best resolution is obtained at or about the midpoint.

Figure 3F:
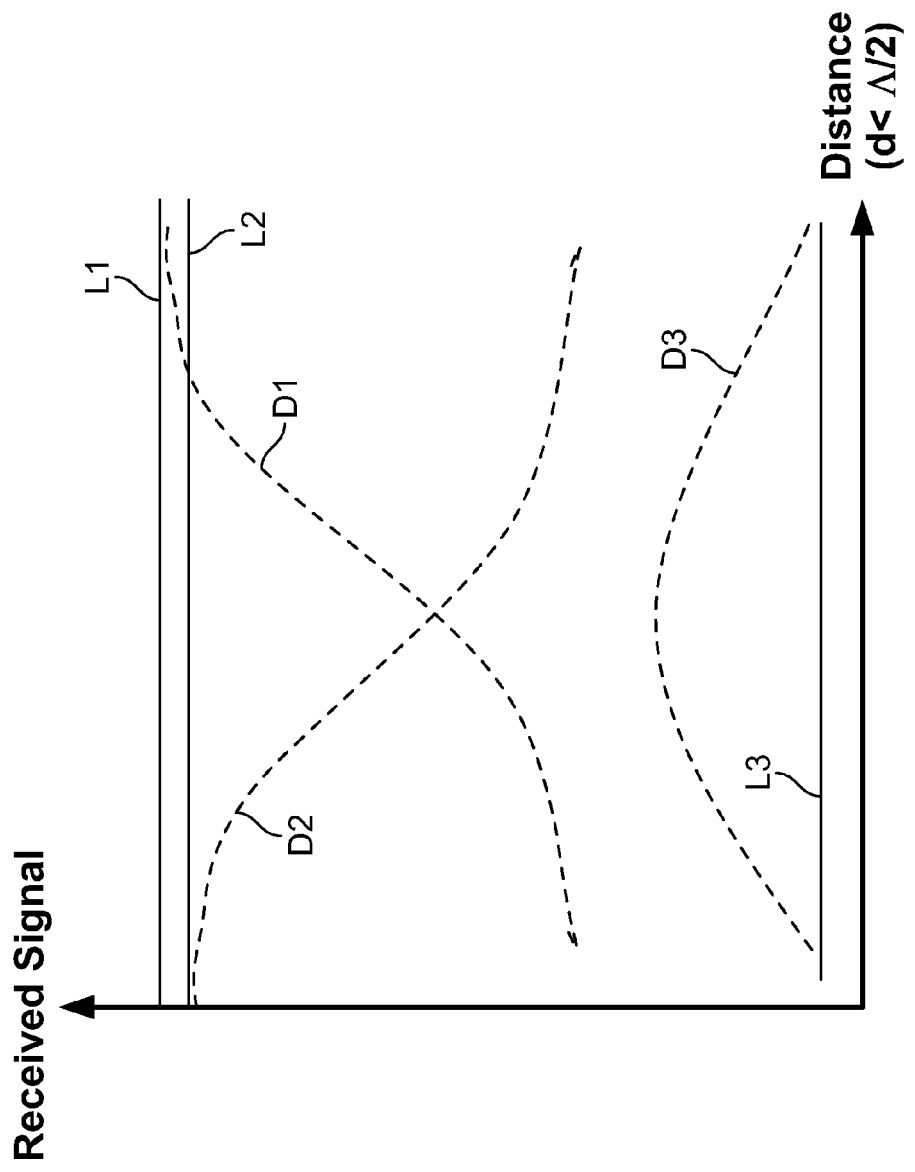
FIG. 3f is an additional corresponding chart of a touch response for the substrate of FIG. 3e.

Note that, in addition to these touching sensitivity ratios, the detection circuitry of the sensor 50 also has available for analysis the touch sensitivity ratio from the touch response curve level D3 (signal Tt_x→Tr_x) shown in FIG. 3f. For the L=Λ/2 case shown in the figure, with no touch, nominally no surface acoustic wave energy from the top transmitting transducer 80a reaches the top receiving transducer 80b because when propagating a distance L=Λ/2 the wave is completely transferred from the top surface 53 to the bottom surface 55. Thus, a non-touch response level L3 of approximately zero is obtained. The effect of a touch is to disrupt this perfect transfer of energy between top and bottom surfaces resulting in a positive touch response curve level D3 for the signal arriving at the top receiving transducer 80b from the top transmitting transducer 80a. The touch response curve level D3 is most sensitive to touch position for values of distance d close to the end, nicely complementing the lack of end position sensitivity of the other two touch response curve levels D1, D2. While not shown in FIG. 3f, the signal Bt_x→Br_x also leads to a touch response curve similar to D3 and may also provide for Y coordinate estimation from the nominal X-axis signals. In a similar fashion, the nominal Y-signals Tt_y→Br_y, Bt_y→Tr_y, Tt_y→Tr_y, Bt_y→Br_y provide for X coordinate estimation.

Beneficial effects of oscillation between surface acoustic waves between the top surface 53 and the bottom surface 55 in the touch region 69 have been discussed above. In the operation of the sensor 50, it is generally desired that the oscillation phenomenon is minimized or eliminated when surface acoustic waves are propagating along the top and bottom reflective arrays 90a-d, 190a-d. There are several approaches to accomplish this. As illustrated in FIG. 3a, an optional border coating 84 may be applied to the back surface 55 but not the front surface 53 (or vice versa). With a coating material and thickness chosen to significantly alter the Rayleigh wave phase velocity, the symmetry between top and bottom surface acoustic waves is broken and there no longer exist coupled identical oscillators or waves; this effectively turns off the oscillation phenomenon. In a related approach, use can be made of the fact that materials used to fabricate reflective arrays generally reduce the Rayleigh wave velocity. By printing the arrays on one surface, for example, the back surface 55 in a negative pattern, the top and bottom arrays 90*a-d*, 190*a-d* may be induced to have different wave velocity-altering effects, thus disrupting the oscillation phenomenon. A third approach is to provide for a substrate 51 with a non-uniform thickness so that the substrate 51 is sufficiently thick in the regions of the arrays to suppress the oscillation phenomenon. This is described in more detail in the above-referenced and incorporated U.S. Patent Application by Hecht et al.

Figure 4A:
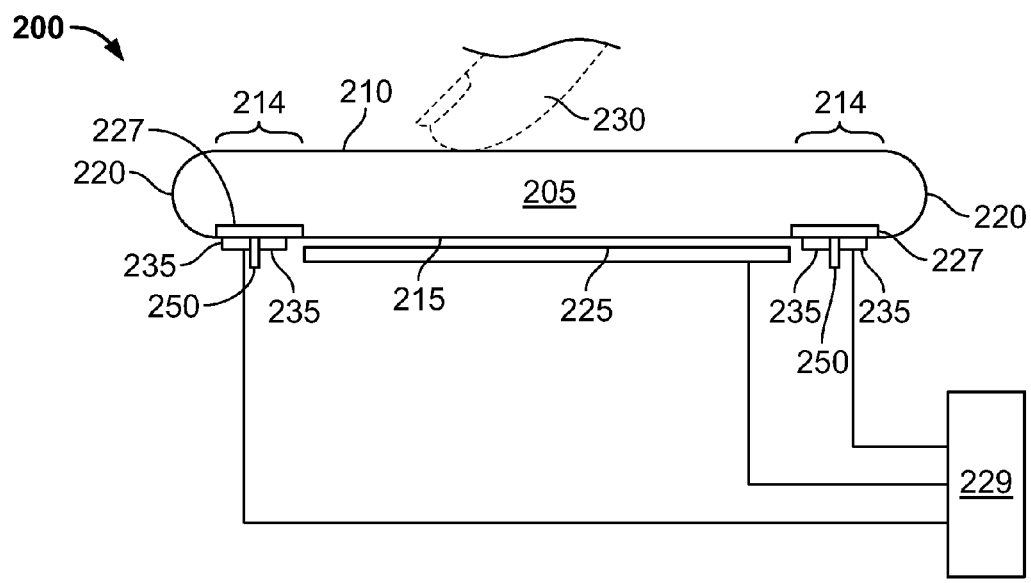
FIG. 4a is a side perspective of a second acoustic touch sensor constructed in accordance with the present invention.

FIG. 4*a* is a side perspective of a second acoustic touch sensor 200 constructed in accordance with the present invention. The touch sensor 200 comprises a substrate 205 with a front surface 210, a back surface 215, and connecting end surfaces 220 joining the peripheral regions 214 of the front surface 210 and of the back surface 215. A connecting end surface 220 need not be curved as shown but may be any shape that facilitates the propagation of surface acoustic waves between the front surface 210 and the back surface 215. The substrate 205 is typically made of some form of glass or other material that is configured to permit the propagation of surface acoustic waves upon the peripheral regions 214 and the connecting end surfaces 220 and, on the non-peripheral regions, to facilitate surface acoustic waves propagating on one surface to transfer, through the substrate 205, to the other surface. The substrate 205 overlies a computer display or computing device display 225, like a liquid crystal display (LCD), a cathode ray tube (CRT), plasma, etc. In a bezeled surface acoustic wave touch sensor, the peripheral region of the front surface is covered by a bezel provided by the housing of the touch sensor or the device integrating the sensor, since the operative elements, i.e., the transducers and reflective arrays, are on the front surface of the substrate. In a zero-bezel or bezel-less surface acoustic wave touch sensor 200, which is shown in the figure, the peripheral region 214 of the front surface 210 is merely the outer/peripheral portion of the front surface 210. Bezel-less surface acoustic wave touch sensors are described in more detail in commonly-owned U.S. Published Application 2011/0234545, entitled "Bezel-Less Acoustic Touch Apparatus", which is herein incorporated by reference. Object 230 is seen as a finger, but it is recognized that touches sensed by the surface acoustic waves may include a stylus pressing against the front surface 210 directly or indirectly, through a cover sheet or an anti-reflective coating, depending upon the application of the touch sensor 200. Acoustic transducers 235 and reflective element arrays (not shown in this figure but described below) are provided on a border layer 227 of opaque paint or ink in the peripheral region 214 of the back surface 215. A mounting or damping material 250 separates the peripheral region 214 into inside and outside areas. The transducers 235 are operably coupled to a controller or control system 229 (which may be part of a system processor in some embodiments) that is also operably coupled to the display 225. The controller or control system 229 drives the operation of the transducers 235 and measures the signals from such transducers to determine the touch coordinates, which are then provided to an operating system and software applications to provide the required user interface with the display 225.

FIG. 4*b* is a simplified plan view of the back surface 215 of the substrate 205. The touch sensor 200 has a mounting or damping material 250 that separates the peripheral region 214 around the back surface 215, and the operative elements disposed thereon, into two areas: an area closest to the edge of the substrate 205 (an outside area) and an area closest to the interior of the substrate 205 (an inside area). Like a conventional acoustic touch sensor, the X-axis and Y-axis pairs of transducers 235 are disposed at right angles to define a two-dimensional coordinate system. In particular, an outside transmitting transducer 235*a* operates with an outside transmitting reflective array 240*a* ($X_T$) and an inside receiving reflective array 240*b* ($x_R$) and an inside receiving transducer 235*b*. An inside transmitting transducer 235*c* operates with an inside transmitting reflective array 240*c* ($k_T$) and an outside receiving reflective array 240*d* ($X_R$) and outside receiving transducer 235*d*. Similarly, an outside transmitting transducer 235*e* operates with an outside transmitting reflective array 240*e* ($Y_T$) and an inside receiving reflective array 240*f* ($y_R$) and inside receiving transducer 235*f*. An inside transmitting transducer 235*g* operates with an inside transmitting reflective array 240*g* ($y_T$) and an outside receiving reflective array 240*h* ($Y_R$) and an outside receiving transducer 235*h*. Consequently, there are two pairs of transducers 235 and two pairs of reflective arrays 240 for each coordinate axis that provide four signals for the sensor 200. Each transducer 235 may either transmit or receive a surface acoustic wave, symmetrically. The reflective arrays 240 reflect a surface acoustic wave in a desired direction, as described below.

As noted in FIG. 4*a*, the touch sensor 200 is operatively connected with a control system 229 for the associated computer or computing device that integrates the sensor 200. The control system 229 generates an electronic signal that excites the transmitting transducers 235*a*, 235*c*, 235*e*, 225*g* to generate respective surface acoustic waves (or wave pulses). The control system 229 also receives respective electrical signals transduced by the receiving transducers 235*b*, 235*d*, 235*f*, 235*h* from the received surface acoustic waves. The control system 229, as used herein, means electronics typically including a microprocessor with firmware and analog electronics to generate excitation signals and to receive back and analyze signals from the touch sensor 200.

Figure 4C:
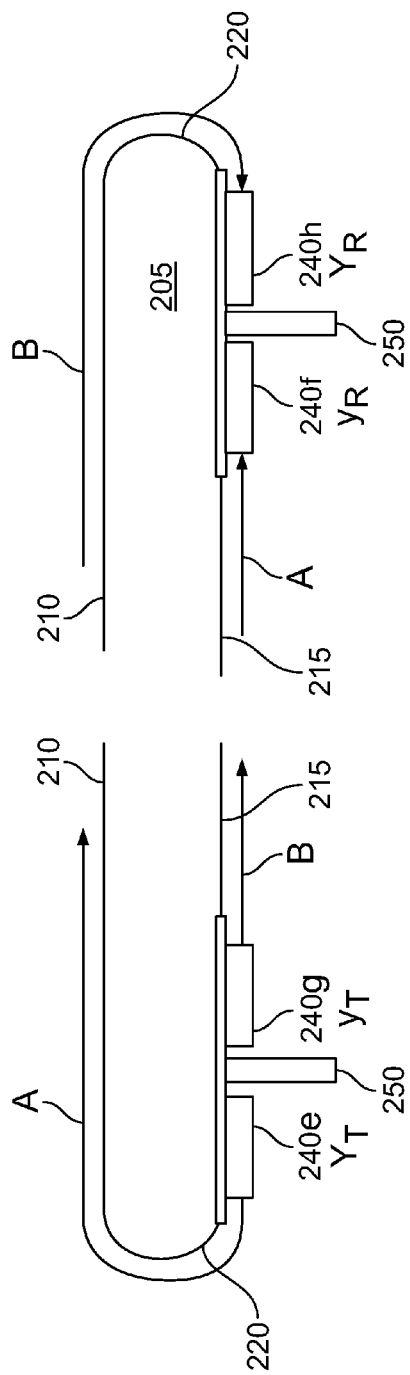
FIG. 4c is a simplified side view of the substrate of FIG. 4b.

FIG. 4*c* is a simplified side view of the substrate 205 that illustrates (with additional reference to FIG. 4*b*) the operation of the sensor 200. For ease of visualization and description, the figure only shows some of the operative elements, specifically, the reflective arrays 240 related to the Y-axis coordinates. The outside transmitting transducer 235*e* generates surface acoustic waves that travel along the negative (−) Y-axis direction of the peripheral region 214 of the back surface 215 on which the outside transmitting reflective array 240*e* ($Y_T$) is situated. The elements of the outside transmitting reflective array 240*e* ($Y_T$) each transmit part of the surface acoustic waves to an adjacent element of the array 240*e*. Also, as seen by the solid line arrow A indicating the wave propagation path, the elements of the outside transmitting reflective array 240*e* ($Y_T$) each couple or reflect part of the surface acoustic waves to travel a) from the outside transmitting reflective array 240*e* ($Y_T$) outwardly along the negative (−) X-axis direction toward and around the proximate curved connecting surface 220; and b) along the positive (+) X-axis direction across the front surface 210 toward the opposing connecting surface 220.

As the surface acoustic waves travel across the front surface 210, the configuration and composition of the substrate 205 permits the surface acoustic waves to travel to the back surface 215 via the energy transfer caused by the action of the Lamb wave modes $S_0$ and $A_0$. The substrate 205 then maintains the wave propagation path on the back surface 215 long enough for the waves to travel to the peripheral region 214 of the back surface 215 and to the inside receiving reflective array 240f ($y_R$). The elements of the inside receiving reflective array 240f ($y_R$) each transmit the received surface acoustic waves to an adjacent element of the array 240f ($y_R$) so that the waves continue traveling along the inside receiving reflective array 240f ($y_R$) along the positive (+) Y-axis direction to the inside receiving transducer 235f.

Similarly, the inside transmitting transducer 235g generates surface acoustic waves that travel along the negative (−) Y-axis direction of the peripheral region 214 of the back surface 215 on which the inside transmitting reflective array 240g ($y_T$) is situated. The elements of the inside transmitting reflective array 240g ($y_T$) each transmit part of the surface acoustic waves to an adjacent element of the array 240g ($y_T$). Also, as seen by the solid line arrow B indicating the wave propagation path, the elements of the inside transmitting reflective array 240g ($y_T$) each couple or reflect part of the surface acoustic waves to travel a) from the inside transmitting reflective array 240g ($y_T$) inwardly along the positive (+) X-axis direction away from proximate curved connecting surface 220. As the surface acoustic waves travel across the back surface 215, the configuration and composition of the substrate 205 permits the surface acoustic waves to travel to the front surface 210 via the energy transfer caused by the action of the Lamb wave modes $S_0$ and $A_0$. The waves continue along the positive (+) X-axis direction such that the substrate 205 maintains the wave propagation path on the front surface 210 long enough for the waves to travel to the peripheral region 214 of the front surface 210 and then a) around the proximate curved connecting surface 220; and b) along the negative (−) X-axis direction to the outside receiving reflective array 240h ($Y_R$). The elements of the outside receiving reflective array 240h ($Y_R$) each transmit the received surface acoustic waves to an adjacent element of the array 240h so that the waves continue traveling along the outside receiving reflective array 240h ($Y_R$) along the positive (+) Y-axis direction to the outside receiving transducer 235h.

It is understood that the sensor 50 is configured and operated in similar fashion for the operative elements related to the X-axis coordinates. Specifically, the outside-inside transmitting transducers 235a, 235c; the outside-inside receiving transducers 235d, 235b; the outside-inside transmitting reflective arrays 240a ($X_T$), 240c ($x_T$); and the outside-inside receiving reflective arrays 240d ($X_R$), 240b ($x_R$) operate in the same fashion for the X-axis coordinate direction.

A touch of the touch region on the front surface 210 by an object 230, such as finger or stylus, absorbs a portion of the energy of the surface acoustic waves propagating across the front surface 210 and causes an attenuation of the waves passing through the point of touch. The resulting attenuation is detected by the receiving transducers as a perturbation in the acoustic signal. The control system 229 processes and analyzes all of the electrical signals transduced by the receiving transducers, including those related to waveform perturbations, to detect the touch coordinates and position information in a manner similar to that described above, for example, with respect to FIG. 3e. Further, the control system 229 maps the touch coordinates and position information to the appropriate control actions of the user interface shown in the display 225 that is generally placed behind the back surface 215.

For example, the control system 229 uses the touch dip delay times in the Y-axis coordinate signals to provide the Y-axis coordinate measurement. The control system derives the X-axis coordinate measurement, using the previously-described analysis, from the ratio of the dip strengths, i.e., the touch sensitivities, in the top-bottom oscillation signals $Y_T \rightarrow y_R$ and $y_T \rightarrow Y_R$. Thus, the acoustic touch sensor 200 provides an XY coordinate multi-touch input device system.

Advantageously, the sensor 200 enables the entire top surface 210 to be acoustically active. With no bezel required and maximal touch sensitive surface area, this is in keeping with market trends for increasingly sleek and space efficient product designs.

It is noted that a design rule for rounded substrate edges in certain bezel-less touch sensors require the edge radius to be greater than or equal to 1.5 mm at the standard transmitting frequency 5.53 MHz. This mitigates so-called Lamb parasitic signal paths, accompanying the use of rounded substrate edging, that parallel the surface acoustic wave propagation path on the touch region and present parasitic signals at the receiving transducers. However, with a small thickness substrate that permits top-bottom oscillation, e.g., 1.6.mm (which is fixed by a desired beat wavelength), the edge radius may be much less than the design rule dimension (e.g., less than or equal to 0.8 mm for a 1.6. mm substrate at 5.53 MHz). This results because the sensor 200 is configured so that some of the conversions of propagating surface acoustic waves to Lamb parasitic signals, and vice versa, may be blocked. For example, the surface acoustic waves generated by the outside bottom transmitting transducer 235e will travel around the proximate connecting surface 220 along the top surface 210, convert into a surface acoustic wave propagating along the back surface 215, and be received by the bottom inside receiving transducer 235f. At the same time, the Lamb parasitic signals generated by the surface acoustic waves propagating around the proximate connecting surface 220 will travel along the top surface 210 and around the connecting surface 220 at the receiving end of the substrate 205 and then blocked on the way towards the bottom inside receiving array 240f and transducer 235f by the mounting or damping material 250. The sensor 200 similarly suppresses, for other signals of the sensor 200, parasitic signals associated with the use of curved edged substrates.

Figure 5:
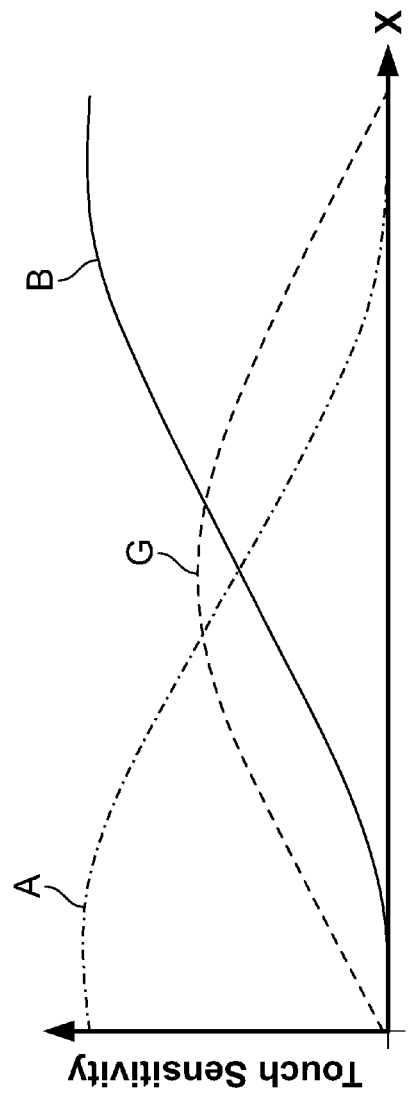
FIG. 5 is a graph of touch sensitivity for the substrate of FIG. 4b.

As noted with respect to FIG. 3e, poor resolution of the touching sensitivity ratios occurs at the ends of the acoustic path through the touch area while the best resolution is obtained at or about the midpoint. This is illustrated in FIG. 5 which shows a graph of the touch sensitivity of the top-bottom oscillation signals $Y_T \rightarrow y_R$ (denoted as curve A to relate to the propagation path A in FIG. 4c) and $y_T \rightarrow Y_R$ (denoted as curve B to relate to the propagation path B in FIG. 4c) versus the distance across the X-axis of the substrate 205. The ratio of the touch dip strengths of the two signals $Y_T \rightarrow y_R$ and $y_T \rightarrow Y_R$ slowly vary near the borders of the substrate 205. The control system 229 may correct this resolution by processing those signals with the strong variation of touch sensitivity peak provided by a bottom-top-and-back-to-bottom oscillation signal $y_T \rightarrow y_R$ from the inside transmitting transducer 235g to the inside receiving transducer 235f (denoted as curve G which is similar to touch response curve level D3 of FIG. 3f).

Figure 6A:
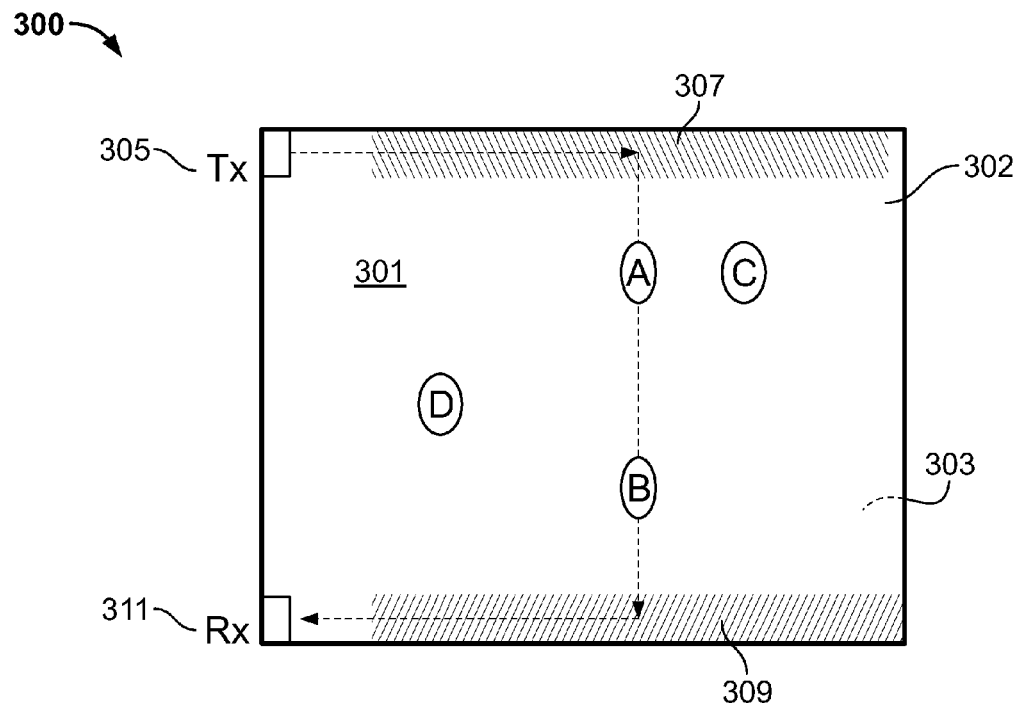
FIG. 6a is a schematic view of a touch surface of a substrate of an acoustic touch sensor of the present invention with sample multiple touch points indicated.

FIGS. 6a-6d illustrate the use of a sensor of the present invention to resolving touch overlap problems in dual-touch or multi-touch. FIG. 6a shows a simplified plan view of an Adler-type sensor 300 having a substrate 301 with a top surface 302 and a bottom surface 303. Further, for an X-axis coordinate determination, the top surface 302 has a top transmitting transducer $T_{Tx}$ and the bottom surface 303 has a bottom transmitting transducer $B_{Tx}$, both represented by the transmitting transducer Tx 305; transmitting reflector arrays 307 on the top surface 302 and on the bottom surface 303; receiving reflector arrays 309 on the top and bottom surfaces 302, 303; and receiving transducers $T_{Rx}$ and $B_{Rx}$ both represented by the receiving transducer Rx 311 (note that the bottom surface elements are not shown in the figure). As in FIG. 3b, top surface 302 and bottom surface 303 have similar arrangements of operative elements. The figure also shows by dotted line arrows an acoustic path of a top launched surface acoustic wave and two touches A, B of the touch region of the top surface 302 that overlap to some degree along the same acoustic path. The figure also shows two touches C, D that occur on different acoustic paths.

The sensor 300 has no problem detecting the respective X-axis coordinate for each of the two touches C, D that occur on different acoustic paths because each touch generates different time delays of the perturbed wave that can be detected and analyzed by the sensor 300. In the case of the two touches A, B that overlap along the same acoustic path, the sensor 300 cannot resolve easily by conventional means the precise X-axis coordinates as the attenuation shadows of the two touches are confounded together resulting in only one determined X-axis coordinate that only roughly approximates the two different X-axis coordinates of the two touches A and B.

Figure 6B:
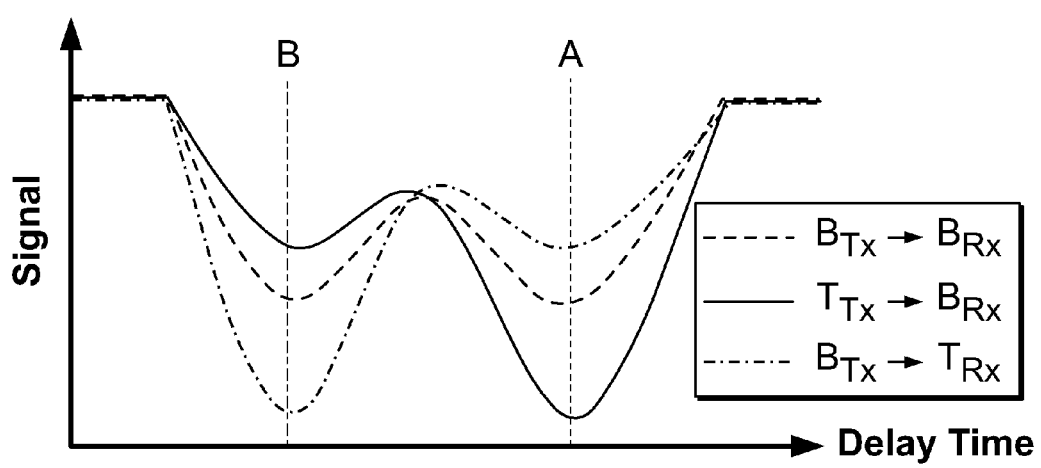
FIGS. 6b-6d are graphs of the signals processed by the sensor of FIG. 6a during a multi-touch operation.
Figure 6C:
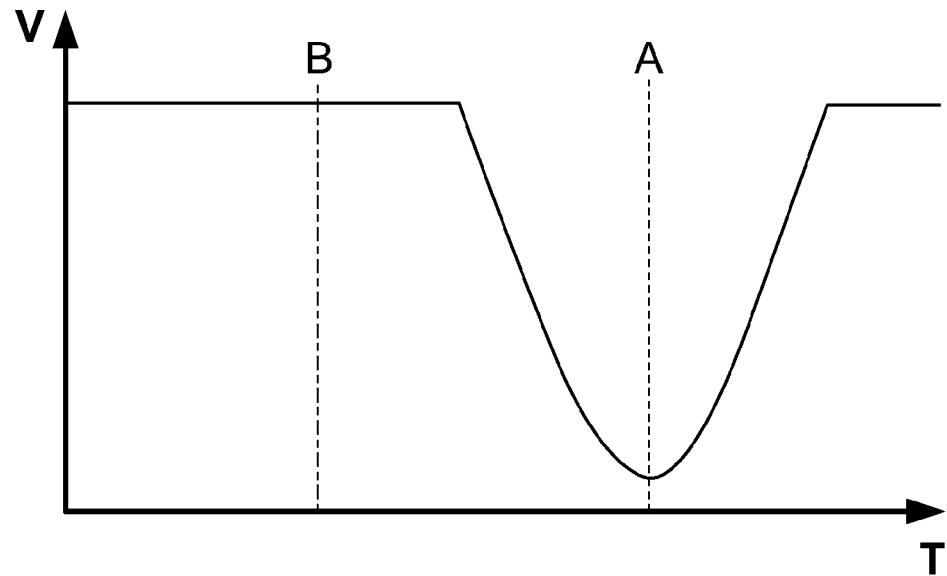
Figure 6D:
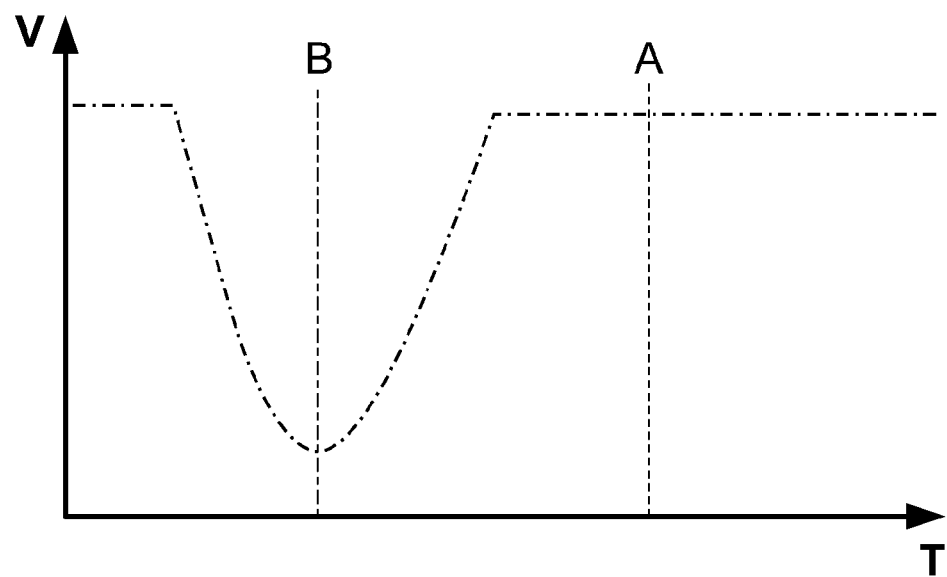

FIG. 6b shows, for the X-axis coordinate, a graph of the received signal versus the delay time of the received signal for the sensor 300. Three curves denote three signals (the signal $B_{Tx} \rightarrow B_{rx}$ from the bottom transmitting transducer to the bottom receiving transducer; the signal $T_{Tx} \rightarrow B_{Rx}$, from the top transmitting transducer 305 to the bottom receiving transducer via top-bottom oscillation; and the signal $B_{Tx} \rightarrow T_{Rx}$ from the bottom transmitting transducer to the top receiving transducer 311 via top-bottom oscillation) processed by the sensor 300 and the approximate touch dip strengths of the signals caused by the two touches A, B. The sensor 300 analyzes and operates on this signal information to isolate each touch A, B and their respective touch dip strength. FIG. 6c shows the resulting isolation of one touch A, mathematically described as (signal $T_{Tx} \rightarrow B_{Rx}$)−α(signal $B_{Tx} \rightarrow T_{Rx}$) and FIG. 6d shows the resulting isolation of the other touch B, mathematically described as (signal $B_{Tx} \rightarrow T_{Rx}$)−β(signal $T_{Tx} \rightarrow B_{Rx}$), where the constants α and β are adjusted to minimize the respective dip width. In this way, the sensor 300 may be able to distinguish the different delay times of the perturbed waves caused by the two touches A, B for the respective axis direction.

Other modifications are possible within the scope of the invention. For example, in each embodiment described, the substrate may take on various sizes and shapes depending upon engineering or application considerations. Moreover, the substrate may be adapted to optimize either the energy transfer, the maintenance of propagation on a respective surface, or both. The substrate may also take on different compositions other than glass, such as aluminum or stainless steel, that can facilitate both the maintenance of propagating surface acoustic waves and the transfer of propagating surface acoustic waves from one surface, through the substrate, to the other surface, as desired.

Also, the sensors may utilize various means to affect the energy transfer or the maintenance of propagation on a respective surface. Also, as noted above, depending upon various factors, the substrate may utilize different thicknesses to maintain surface acoustic waves propagating on a respective surface and as well as utilize different thicknesses to convert a top surface acoustic wave into a bottom surface acoustic wave (and vice versa).

Further, the present invention may be extended to acoustic touch sensors utilizing three axis directions, e.g., XYU axes, providing surface acoustic wave signals for the U-axis direction as well as the X-axis and Y-axis directions. In this case, the $U_1$ ($X_{Tx} \rightarrow Y_{Rx}$) axis would obtain four signals and the $U_2$($Y_{Tx} \rightarrow X_{Rx}$) axis would obtain four signals. Thus, the U-axis would have a total of eight different signals and the XYU axes as a whole would have a total of sixteen different signals.

What is claimed is:

1. An acoustic touch sensor system having multi-touch capability, comprising:
 a substrate that is capable in a peripheral region to propagating surface acoustic waves along substrate surfaces and in a central region to permit top-bottom oscillation of the surface acoustic waves from the one of the surfaces to the other surface through the substrate, said substrate having a top surface, a bottom surface, and a curved connecting surface formed between said top surface and said bottom surface;
 a first transmitting element disposed on an outside area of the peripheral region of the bottom surface and a second transmitting element disposed on an inside area of the peripheral region of the bottom surface;
 a first receiving element disposed on an outside area of the peripheral region of the bottom surface and a second receiving element disposed on an inside area of the peripheral region of the bottom surface, the set of transmitting elements and the set of receiving elements disposed on opposing sides of the central region of the substrate; and
 a controller that excites the first and second transmitting elements to generate respective surface acoustic waves and that analyzes the respective signals received by the first and second receiving elements, said substrate forming at least respective wave paths from the first transmitting element, around the proximate curved connecting surface, through the substrate in the central region and to the second receiving element; and from the second transmitting element, through the substrate in the central region, around the proximate curved connecting surface and to the first receiving element.

2. The system of claim 1, wherein each transmitting element comprises a transmitting acoustic wave transducer and an associated transmitting reflective array and each receiving element comprises a receiving acoustic wave transducer and an associated receiving reflective array.

3. The system of claim 1 further comprising another set of transmitting elements and another set of receiving elements disposed on the other two opposing sides of the central region of the substrate in a similar manner as the respective first sets, each pair of sets being utilized to define a respective axis coordinate of the front surface.

4. The system of claim 1, wherein each receiving element is adapted to produce a touch response signal for a respective touch on the top surface and the controller analyzes the touch response signals and non-touch response signals produced by each receiving element to determine axis coordinate information of the touch on the top surface from the response signals.

5. The system of claim 4, wherein the controller analyzes the ratios of signal losses of touch response signals to determine axis coordinate information of the touch on the top surface.

6. The system of claim 4, wherein the controller analyzes the delay times of touch response signals, and the ratios of signal losses of touch response signals in the top-bottom oscillation-based signals to determine axis coordinate information of the touch on the top surface.

7. The system of claim 6, wherein certain of the axis coordinate information is dependent upon the ratios of signal losses of touch response signals in the top-bottom oscillation-based signals; and the distance between respective transmitting and receiving elements on the top and bottom surfaces.

8. The system of claim 6, further comprising another set of transmitting elements and another set of receiving elements disposed on the other two opposing sides of the central region of the substrate in a similar manner as the respective first sets, each pair of sets being utilized to define a respective axis coordinate of the front surface.

9. The system of claim 4, wherein the controller analyzes the ratios of signal level changes of touch response signals to determine axis coordinate information of the touch on the top surface.

10. The system of claim 1, wherein the substrate further has a damping material separating the peripheral region into outside and inside areas.

11. The system of claim 1, wherein the substrate is adapted to provide non-symmetrical top and bottom surfaces acoustic waves in a peripheral region in order to propagate surface acoustic waves.

* * * * *